Oct. 2, 1945. C. F. JOHNSON 2,385,993
VALVE
Filed Oct. 27, 1944 2 Sheets-Sheet 1
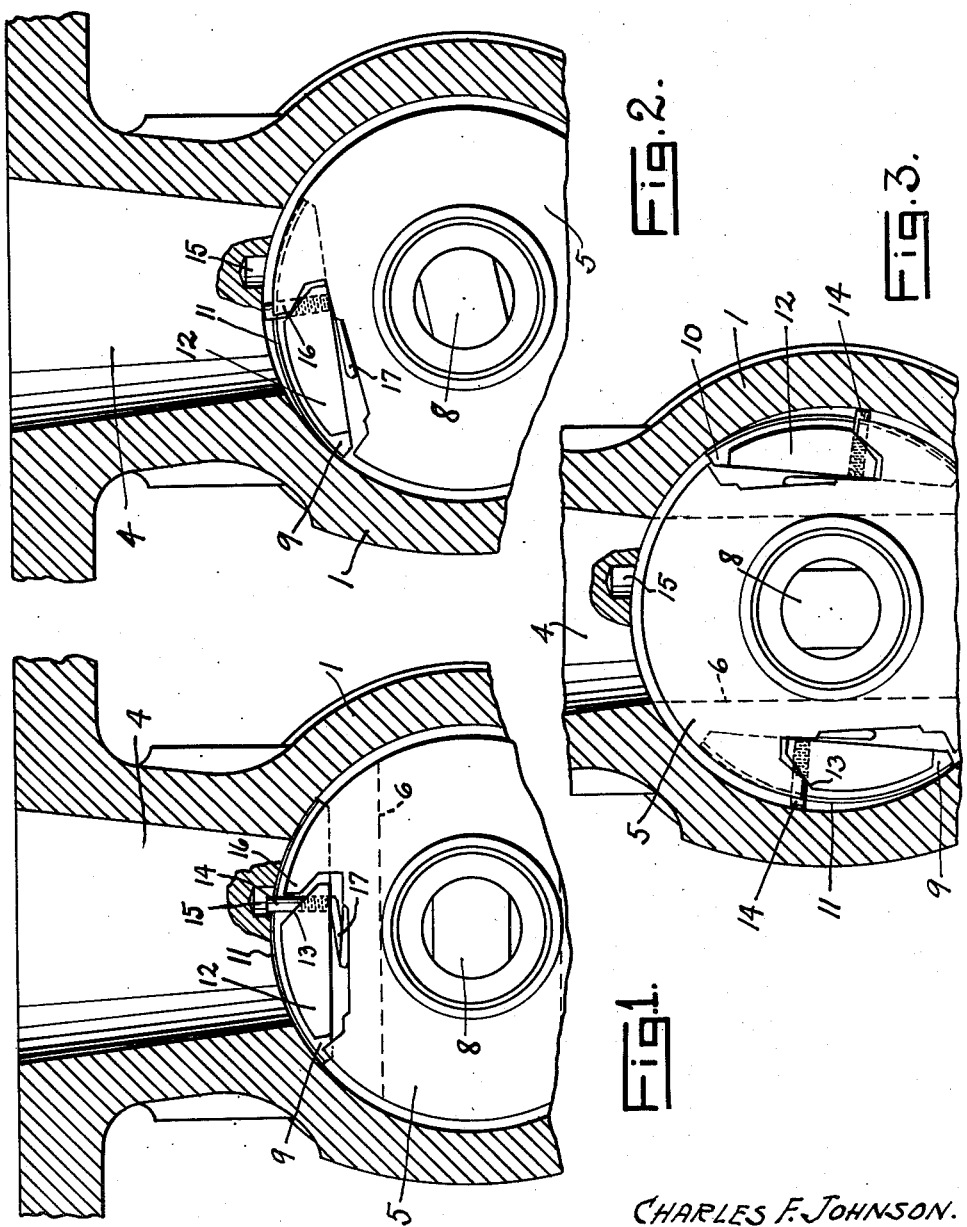
CHARLES F. JOHNSON.
INVENTOR.

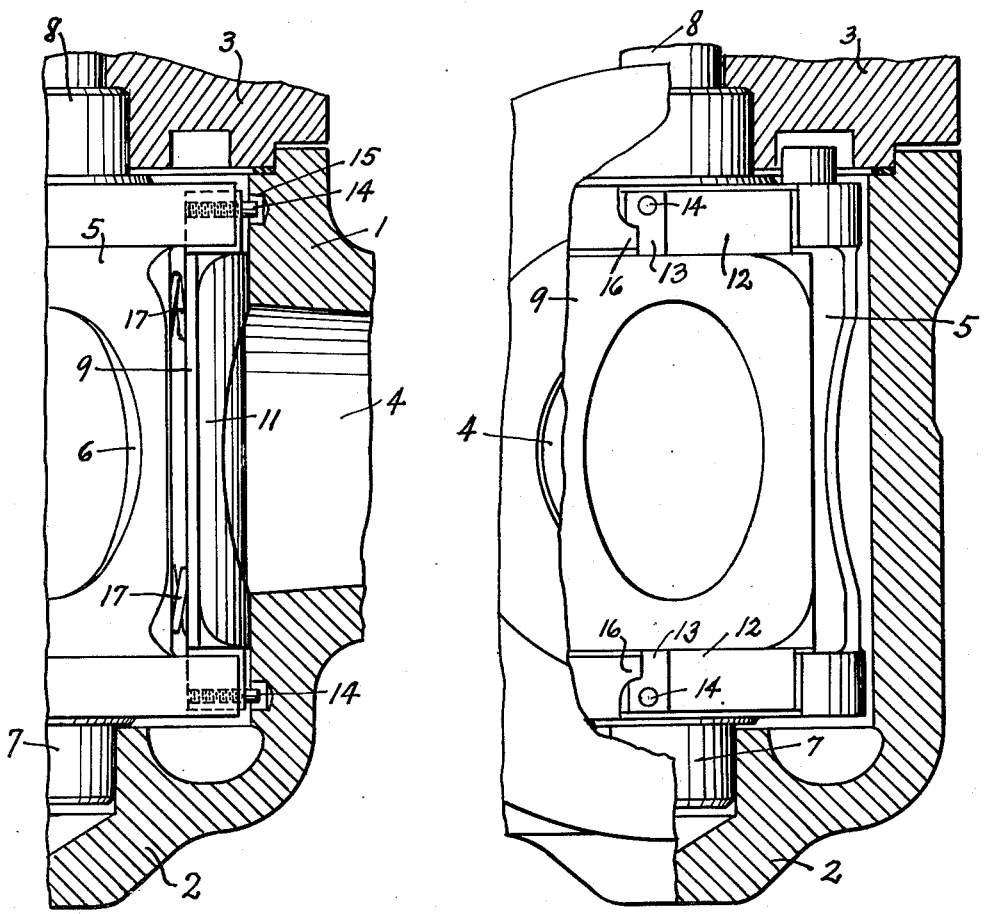

Patented Oct. 2, 1945

2,385,993

UNITED STATES PATENT OFFICE 2,385,993

VALVE

Charles F. Johnson, Whittier, Calif., assignor to Reed Roller Bit Company, Houston, Tex., a corporation of Texas Application October 27, 1944, Serial No. 560,561

4 Claims. (Cl. 251—102)

This invention relates to valves, and more particularly to valves of the rotary type.

The general object of the invention is to provide means for reducing to a minimum the wear on and damage to the closure members of such valves due to the frictional drag of the same over the inner surface of the valve chamber, and to provide a valve which may be more easily actuated than valves heretofore known. The invention has special utility when applied to valves having closure members having seating surfaces formed of relatively soft material. To this end the invention contemplates the provision of means for retracting the closure members radially before they move circumferentially, thus substantially withdrawing them from contact with the inner surface of the valve chamber. The present invention is in the nature of an improvement over the valve structure, shown in my prior patent, No. 2,289,270, dated July 7, 1942. In the structure of this prior patent the valve body was provided with a liner specially machined in such a way as to co-operate with the closure members and produce the desired result.

A specific object of the present invention is to provide a structure fully as advantageous as the patented structure, so far as the prevention of wear is concerned, but in which the necessity for using any special liner is avoided. This results in a greatly simplified construction and eliminating the major portion of the machine work, thus enabling my improved valve to be produced much more cheaply.

In order that the invention may be readily understood, reference is had to the accompanying drawings, forming part of this specification and in which:

Fig. 1 is a fragmentary transverse section through my improved valve, parts being shown in elevation, and the closure member being illustrated in port closing position.

Fig. 2 is a similar view showing the initial movement of the parts away from such position.

Fig. 3 is a substantially similar view showing the valve in full open position.

Fig. 4 is a fragmentary longitudinal section through the valve with the parts in the position shown in Fig. 1, and Fig. 5 is a similar view taken on a plane at right angles to that of Fig. 4.

Referring to the drawings in detail, my improved valve comprises the usual valve body 1, closed at its lower end, as indicated at 2, and having a cap or cover 3 secured to its upper end. The valve body is provided with diametrically opposite ports 4, only one of which is shown in the drawings.

A valve carrier 5 is rotatably mounted within the interior of the valve body co-axially thereof by means of a pintle 7 adjacent its lower end, engaging a socket in the lower end 2 of the valve body. The upper end of the carrier is rotatably supported by means of a stem 8 which passes through an opening in the cover plate 3 and is provided with suitable packing.

The carrier 5 is of such size that a substantial clearance is provided between its outer surface and the inner surface of the cylindrical chamber inside the valve body, as clearly shown in Figs. 1 and 2. The valve carrier has an opening 6 therethrough, so that when in the position shown in Fig. 3 it will provide a passage directly through the valve body from one port to the other.

Freely mounted upon this carrier 5 are two closure segments 9 and 10 (see Fig. 3), which closure segments or members are adapted to seat against the inner surface of the cylindrical valve chamber when the carrier is moved to valve closing position. In order to form a tight seal, the arcuate surfaces of the closure members 9 and 10 are preferably provided with a soft facing material such as rubber, vulcanized to the face of the segment, as indicated at 11.

Lugs 12 project from each end of each closure member or segment, as shown in Fig. 5, and as also indicated in Figs. 1-3. These lugs have at one end an inclined or cam face 13, and this is adapted to be engaged by a hook or finger 16 formed on the carrier.

A pin 14 is set into each lug 12, adjacent the inclined face thereof and projects therefrom in a substantially radial direction. When the valve is in closed position, as shown in Fig. 1, the end of each pin is received in a socket or recess 15 formed in the inner surface of the cylindrical valve chamber at points above and below the port 4, as clearly shown in Fig. 4. When the pins 14 thus enter the recesses 15, the segmental closure members are permitted to tightly seal against the inner surface of the cylindrical valve chamber, thus effectively closing the ports 4. The closure members are loosely mounted in recesses in the carrier and are urged outwardly by springs 17 interposed between each member and the carrier.

When it is desired to open the valve, the carrier is turned counter-clockwise, as viewed in Fig. 1. The result of the initial movement in this direction is to cause the hooks or fingers 16 to ride up on the cam faces 13 and thus move the closure member radially inward, as shown in Fig. 2, thereby withdrawing the pins 14 from the recesses 15. It will be understood that the interlocking of these pins and recesses, as shown in Figs. 1 and 4, serves to prevent any rotary or circumferential movement of the closure members, and such circumferential movement can only take place after the pins have been withdrawn, as shown in Fig. 2. As soon as the pins have been thus withdrawn, and upon continued counter-clockwise rotation of the carrier, the closure members begin to travel with the carrier. It will be noted, however, that the ends of the pins 14, as soon as they clear the recesses 15, engage and ride upon the inner surface of the cylindrical valve chamber, thus maintaining the closure members out of contact with such surface. In this way, the closure members are prevented from being dragged around over the inner surface of the valve chamber as the carrier is moved to open position, and are only permitted to engage this surface when, upon being moved back in a clockwise direction to valve closing position, the pins 14 drop into the recesses 15.

From the foregoing it will be seen that no liner or special machine work is required, as in my prior patent, above referred to, and that the end of the pins 14 simply ride upon the inner surface of the usual cylindrical valve chamber, the only special work required being the drilling of the holes or recesses 15 in the valve body.

What I claim is:

1. A valve comprising a valve body having a cylindrical chamber therein and ports communicating with said chamber, a carrier rotatably mounted in said chamber co-axially thereof, segmental closure members positioned in said chamber for circumferential movement to and from positions to close said ports and for radial movement away from the wall of said chamber, co-operating means on the closure members and carrier for retracting the closure members radially, and displacing the same, a projection carried by each closure member and adapted to ride on the inner surface of said cylindrical chamber, and said inner surface having a recess formed therein and disposed in the path of travel of each projection, said recess being positioned to register with and receive said projection when the closure member is in port closing position.

2. A valve comprising a valve body having a cylindrical chamber therein and ports communicating with said chamber, a carrier rotatably mounted in said chamber co-axially thereof, segmental closure members positioned in said chamber for circumferential movement to and from positions to close said ports and for radial movement away from the wall of said chamber, co-operating means on the closure members and carrier for retracting the closure members radially, and displacing the same, a projection carried by each closure member and adapted to ride on the inner surface of said cylindrical chamber to maintain the closure member out of contact with said surface during circumferential movement, said inner surface having a recess formed therein and disposed in the path of travel of each projection, said recess being positioned to register with and receive said projection when the closure member is in port closing position, and resilient means for forcing said closure member into contact with the surface of said cylindrical chamber when said projection comes into registry with said recess.

3. A valve comprising a valve body having a cylindrical chamber therein and ports communicating with said chamber, a carrier rotatably mounted in said chamber co-axially thereof, segmental closure members positioned in said chamber for circumferential movement to and from positions to close said ports and for radial movement away from the wall of said chamber, co-operating means on the closure members and carrier for retracting the closure members radially, and displacing the same, projections carried by each closure member adjacent the ends thereof and adapted to ride on the inner surface of said cylindrical chamber at points beyond said ports, and said valve body having internal recesses disposed in the paths of travel of said respective projections, said recesses being positioned to register with and receive said projections when the closure member is in port closing position.

4. A valve comprising a valve body having a cylindrical chamber therein and ports communicating with said chamber, a carrier rotatably mounted in said chamber co-axially thereof, segmental closure members positioned in said chamber for circumferential movement to and from positions to close said ports and for radial movement away from the wall of said chamber, co-operating means on the closure members and carrier for retracting the closure members radially, and displacing the same, said means including an inclined face on the closure member engaging an element on the carrier, a pin extending radially from said member adjacent said inclined face and adapted to ride on the inner surface of said cylindrical chamber, and said cylindrical surface having a recess formed therein and disposed in the path of travel of said pin, said recess being positioned to register with and receive said pin when the closure member is in port closing position.

CHARLES F. JOHNSON.